United States Patent [19]

Ramisch et al.

[11] Patent Number: 4,823,450
[45] Date of Patent: Apr. 25, 1989

[54] ROLLER UNIT FOR CALENDERS, PLANISHERS OR THE LIKE

[75] Inventors: Rolf Ramisch, Krefeld; Josef Pav, Krefeld-Fischeln; Hans-Dieter Patermann, Willich; Dieter H. Müller, Achim, all of Fed. Rep. of Germany

[73] Assignee: Ramich Kleinewefers GmbH, Fed. Rep. of Germany

[21] Appl. No.: 924,994

[22] Filed: Oct. 30, 1986

[30] Foreign Application Priority Data

Nov. 2, 1985 [DE] Fed. Rep. of Germany ... 8531065[U]
Sep. 9, 1986 [EP] European Pat. Off. ......... 861124659

[51] Int. Cl.⁴ ............................................. B21B 13/02
[52] U.S. Cl. .................. 29/116.2; 29/121.1; 29/121.8; 29/130
[58] Field of Search ............. 29/110, 116 R, 116 AD, 29/130, 121.1, 121.8, 116.1, 116.2; 162/357, 287, 282; 100/176, 160

[56] References Cited

U.S. PATENT DOCUMENTS

| 4,037,299 | 7/1977 | Smith | 29/130 |
| 4,200,389 | 4/1980 | Matsui et al. | 100/176 |
| 4,213,232 | 7/1980 | Biondetti et al. | 29/116 AD |
| 4,291,447 | 9/1981 | Marchioro | 29/116 AD |
| 4,292,716 | 10/1981 | Marchioro | 29/116 AD |
| 4,378,622 | 4/1983 | Punkston et al. | 29/130 |
| 4,389,932 | 6/1983 | Pav | 29/116 AD |
| 4,498,383 | 2/1985 | Pav et al. | 29/116 AD |
| 4,583,460 | 4/1986 | Maslin et al. | 29/130 |
| 4,625,637 | 12/1986 | Pav et al. | 29/116 AD |

Primary Examiner—Carl E. Hall
Assistant Examiner—Irene Cuda
Attorney, Agent, or Firm—Hill, Van Santen, Steadman & Simpson

[57] ABSTRACT

The invention is to a roller unit for calenders, planishers or the like, comprising a flex-compensated roller having a roller shell which is hydraulically supported, for the compensation of sags, the roller assembly comprising a mating roller, whereby one of the rollers exhibits a surface engraving, characterized in that the flex-compensated roller is provided with the surface engraving; and in that the surface engraving or, respectively, its carrier is detachably arranged.

11 Claims, 1 Drawing Sheet

ROLLER UNIT FOR CALENDERS, PLANISHERS OR THE LIKE

BACKGROUND OF THE INVENTION

1. Background of the Invention

The invention relates to a roller unit for calenders, planishers or the like, including a flex-compensated roller having a roller shell which is supported—for example, hydraulically—for the compensation of sags, and including a mating roller, whereby one of the rollers includes a surface engraving; the invention also relates to a method for the manufacture of such a roller unit.

2. Description of the Prior Art

Other supports such as, for example, electrically heated supporting elements are known in addition to hydraulic supports, these expanding to a greater or lesser degree as they are heated and, thus, enabling a compensation of the sag in such roller units.

Such roller units serve for pressure treatment of foils, webs and the like, whereby one of the rollers is provided with a great variety of surface engravings so that this roller only exerts partial pressures on the foils, webs or the like.

In order to keep the sag of the mating roller low, this mating roller is made either as a solid roller or as a hollow roller having a wall thickness which causes only slight sag. The mating roller may be provided with a system of bores for heating purposes.

The flex-compensated roller has, for example, a hydraulically supported roller jacket, whereby the flex compensation is either directly generated via hydraulic pressure or via hydraulically actuated bearing elements which are seated on a stationary yoke. Up to now, the mating roller has been provided with the surface engraving. In general, a plurality of different surface engravings are present for a calender, so that the engraved mating rollers must be changed given a change in production. The costs for such mating rollers are high because they are executed as solid rollers or as hollow rollers having a thick wall thickness, because appropriate bearing seats must be provided for bearing the mating rollers, and because these mating rollers are frequently heated and, accordingly, must include bores as well as connections for a heating means. When changing the engraved mating rollers, problems arise due to the weight and due to the difficult manipulability caused as a result thereof. Installation and dismantling of the engraved mating rollers are involved since both the bearing as well as the connections for the heating means must be installed or, respectively, dismantled.

SUMMARY OF THE INVENTION

The object of the invention is to improve the roller unit of the type described to the effect that changing the surface engraving is simplified thereby reducing the costs for the surface-engraved roller.

This object is achieved in accord with the invention in that the flex-compensated roller is provided with the surface engraving and in that the surface engraving or, respectively, its carrier is detachably arranged.

The surface engraving can thereby be applied to the roller shell.

A further embodiment of the invention provides that the surface engraving is applied on a sleeve surrounding the roller shell.

As warranted, the invention also proposes that the roller shell and/or the sleeve be removable in axial direction.

A further embodiment of the invention provides that the sleeve and/or the roller shell, at least the supporting region thereof, is composed of a material having a lower coefficient of thermal expansion than the structural part carrying it.

The invention may also provide that the inside diameter of the sleeve and/or of the roller shell surrounding it essentially corresponds to the outside diameter of the structural part carrying it, corresponding thereto in the cold condition.

It can also be provided in the invention that the outside diameter of the roller shell at room temperature is slightly smaller than the inside diameter of the sleeve and means for heating the roller shell during operation are provided.

During operation, the sleeve is thereby automatically connected to the roller shell but can be removed without difficulty during operating pauses. The means for heating the roller shell can be of several kinds, for example it can be a matter of heating by friction, of an inductive heating of the roller jacket, of fanning with warm air, of spraying with warm oil or the like.

An especially preferred embodiment of the invention is characterized in that, given employment of a hydraulic support of the roller shell, a tempering means for the hydraulic fluid is provided, this holding the hydraulic fluid at a prescribed temperature above room temperature. The hydraulic fluid already present given a hydraulic support is thereby used as heat carrier.

A further embodiment of the invention provides that the tempering means can be switched to such a cooling mode that the hydraulic fluid has a temperature below room temperature. The cooling mode of the tempering means thereby provided allows the sleeve to be detached from the roller shell a very short time after the end of operations. The invention further proposes that the outside circumference of the roller shell presses against the inside circumference of the sleeve with a friction-type lock at room temperature and means for cooling the roller shell to a temperature below room temperature when not in operation are provided. It is thereby possible to then fully load the roller unit immediately after being turned on. A great variety of measures are suitable for cooling the roller shell, for example fanning with cooled air.

A preferred embodiment of the invention thereby provides that, given employment of a hydraulic support of the roller shell, a cooling means for the hydraulic fluid is provided, this cooling means cooling to a temperature below room temperature. The charging thereby ensues with cooled hydraulic fluid.

Further, the invention also provides that the roller shell comprises a low wall thickness which is inadequate for employment of the roller shell by itself and that the stability required during operation is achieved by supporting against the sleeve. It is then thereby possible to lend the bipartite combination of roller shell and sleeve roughly the same stability properties as required given flex-compensated or sag-controlled rollers having a one-piece shell and which are therefore standard. On the one hand, the shell must thereby be so deformable that it is capable of changing its sag given a change in the supporting forces. On the other hand, the shell should be so stiff that no disturbing cross-sectional deformations occur during operation. Since, given a removed sleeve, the roller shell only protects the supporting means and, given a hydraulic bearing, is intended to prevent an undesired emergence of oil, the shell can be executed thin-walled. During operation, however, when the sleeve is slipped on, the required stability derives without the bipartite shell having too great a stiffness due to excessively great heat.

A further embodiment of the invention provides that the roller shell has a lesser wall thickness than the sleeve.

As warranted, one may thereby proceed such that the wall thickness of the roller shell is in the range of 5 through 20 mm and that of the sleeve is in the range of 10 through 30 mm, whereby the sum of the two is in the range of 10 through 40 mm.

It can thereby be provided in a particular embodiment that the wall thickness of the roller shell is about 8 mm and that of the sleeve is about 18 mm.

The invention further proposes a method for the manufacture of a roller unit wherein the roller shell has a lesser wall thickness than the sleeve, this method being characterized in that the roller shell is fabricated of a first tube having such a great wall thickness that it exhibits adequate inherent stability for the initial processing; in that the outside circumference is brought to its nominal dimension as initial processing; in that an outer supporting tube having a lower coefficient of thermal expansion and having the inside dimensions of the sleeve is subsequently slipped over the first tube and is connected thereto with friction-type lock by means of a temperature elevation; and in that the inside circumference of the first tube is subsequently brought to its nominal dimension.

One can thereby proceed such that the sleeve is employed as an outer supporting tube.

The invention further proposes a method of the typed described which is characterized in that the sleeve is fabricated of a second tube having such a great wall thickness that it has adequate inherent stability for the initial processing; in that the inside circumference is brought to its nominal dimension as initial processing; in that an inner supporting tube having a greater coefficient of thermal expansion and having the outside dimensions of the roller shell is subsequently inserted into the second tube and is connected thereto with friction-type lock by means of temperature elevation; and in that the outside circumference of the second tube is subsequently brought to its nominal dimension.

It can thereby be provided that the roller shell is employed as an inner supporting tube.

In the roller unit of the invention, the mating roller can be formed with a smooth surface. Given a change of the surface engraving, it therefore need not be replaced. The only thing having to be replaced is the lighter roller shell or, respectively, the lighter sleeve of the flex-compensated roller. The roller shell and/or the sleeve can be removed from the flex-compensated roller in an axial direction. Advantages thereby arise not only in view of lower manufacturing costs but also in view of a simpler installation and dismantling.

In the preferred embodiment of the invention wherein the sleeve is composed of a material having a lower coefficient of thermal expansion than the roller shell carrying it, changing the surface engraving is simplified even farther in that, namely, appropriate matching of the inside diameter of the roller jacket with the inside diameter of the sleeve assures that the sleeve can be removed or, respectively, slipped on without further ado in its cold condition, whereas the sleeve is reliably seated with a friction-type lock on the carrying roller jacket in the operating condition and the temperature then prevailing, being reliably seated thereon as a consequence of the thermally produced expansion. This idea of retaining the sleeve by thermal tension is disclosed, for example in German OS No. 21 48 324, in German Pat. No. 23 15 090 and in German OS No. 23 40 577 and is thus known per se.

BRIEF DESCRIPTION OF THE DRAWINGS

The invention shall be set forth in detail below on the basis of exemplary embodiments with reference to the schematic drawing. Thereby shown are.

DESCRIPTION OF THE PREFERRED EMBODIMENTS

Figure 1:
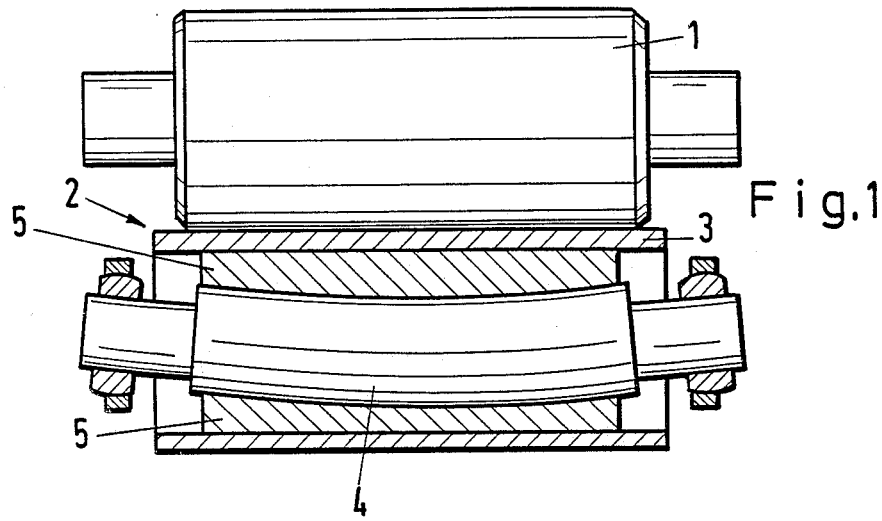
FIG. 1 illustrates a first exemplary embodiment of a roller unit of the invention with one roller in elevation and one roller in cross section.

A mating roller 1 which is formed as a solid roller or as a hollow roller having a high wall thickness is a part of the illustrated roller unit. The mating roller 1 can include bores (not shown) of a heating system.

Also included in the roller unit is a hydraulically flex-compensated roller 2 including a roller shell 3 which is supported on a stationary yoke 4 for the compensation of sags, for example being hydraulically supported. The exemplary hydraulic support 5 is not shown in detail. Various embodiments of such supports are known. For example, they comprise a plurality of axially distributed elements which act upon the inside circumference of the roller shell 3. In other embodiments, the inside of the roller shell 3 is hydraulically charged with pressure, whereby an expansion of the roller shell serves the purpose of flexural compensation.

On its outer circumferential surface, the roller shell 3 includes a surface engraving which is not shown in detail.

Figure 2:
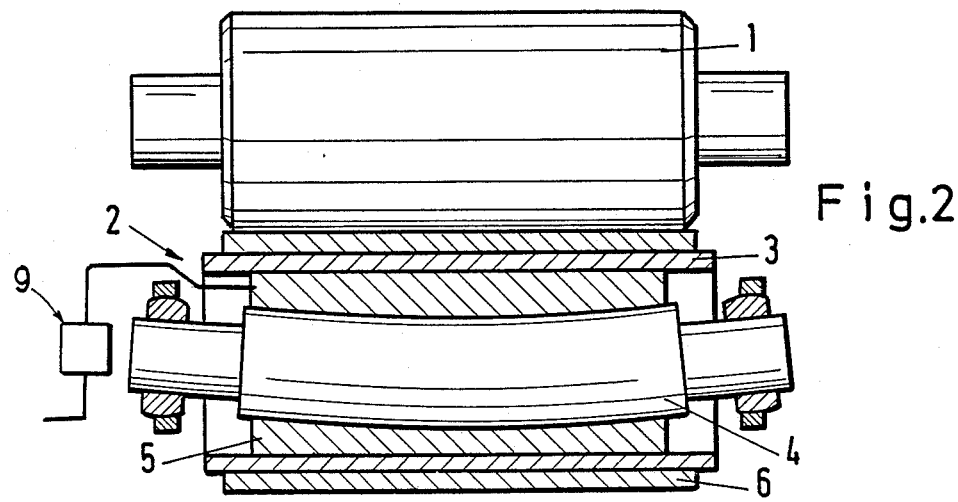
FIG. 2 illustrates another exemplary embodiment of the roller unit of the invention in a view corresponding to FIG. 1.

In the embodiment of FIG. 2, the outer circumferential surface of the roller shell 3 is smooth. A sleeve 6 whose outer circumferential surface is provided with the surface engraving is slipped onto the roller shell 3. Since the roller shell 3 as well as the sleeve 6 are relatively thin-walled, the sleeve 6 also experiences a corresponding flexural compensation.

Figure 3:
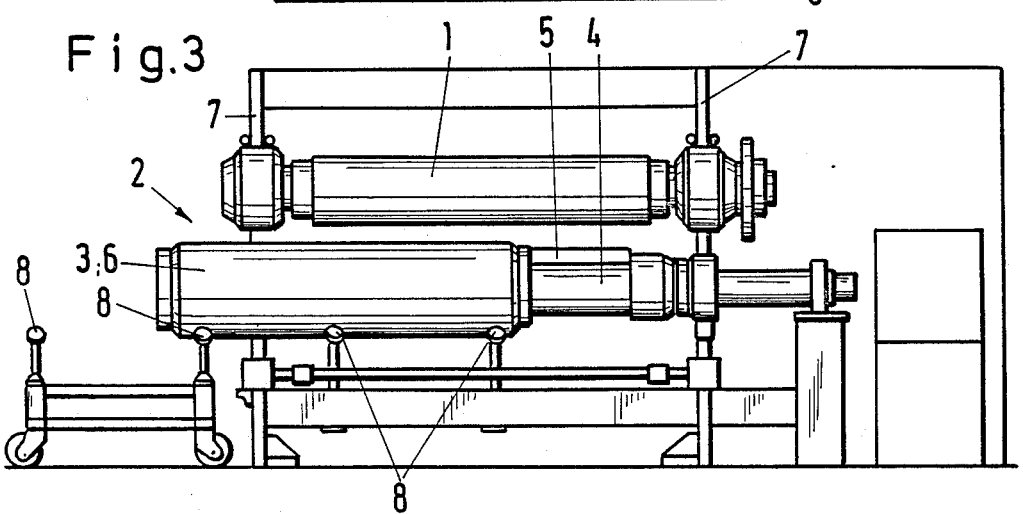
FIG. 3 illustrates a calender including a roller changing means, shown in projection.

FIG. 3 shows the roller unit in a calendar of which only two frame walls 7 lying opposite one another are shown. The mating roller 1 is seated in the frame wall 7 as shown. The flex-compensated roller 2 is likewise seated in the frame walls below the mating roller 1, being seated, however, in end shields which are arranged adjustable in the direction toward the bearing of the mating roller 1. For the purpose of changing the surface engraving, an end shield of the hydraulically flex-compensated roller 2 is removed and the roller shell 3 or, respectively, the sleeve 6 is then withdrawn in axial direction, whereby the roller shell 3 or, respectively, the sleeve 6 is guided on supporting rollers 8. A new roller shell 3 or, respectively, a new sleeve 6 having a different surface engraving can be subsequently slipped onto the stationary yoke 4.

Given the exemplary embodiment of FIG. 2, it can be provided in an especially advantageous way that the roller shell 3 is fabricated of a material having a greater coefficient of thermal expansion than the sleeve 6, whereby the outside diameter of the shell 3, in its cold condition, essentially corresponds to the inside diameter of the sleeve 6. A simple removal or, respectively, slip-on the sleeve 6 is thereby possible in the cold condition, whereas the sleeve 6 is firmly seated on the roller shell 3 with friction-type lock at the operating temperature due to the arising thermal tension.

For example, aluminum can be employed as material for the roller shell and steel, for example, can be employed for the sleeve.

The invention may also provide that the inside diameter of the sleeve and/or of the roller shell surrounding it essentially corresponds to the outside diameter of the structural part carrying it, corresponding thereto in the cold condition.

It can also be provided in the invention that the outside diameter of the roller shell at room temperature is slightly smaller than the inside diameter of the sleeve and means for heating the roller shell during operation are provided.

During operation, the sleeve is thereby automatically connected to the roller shell but can be removed without difficulty during operating pauses. The means for heating the roller shell can be of several kinds, for example it can be a matter of heating by friction, of an inductive heating of the roller jacket, or fanning with warm air, of spraying with warm oil or the like.

An especially preferred embodiment of the invention is characterized in that, given employment of a hydraulic support of the roller shell, a tempering means 9 for the hydraulic fluid is provided, this holding the hydraulic fluid at a prescribed temperature above room temperature. The hydraulic fluid already present given a hydraulic support is thereby used as heat carrier.

A further embodiment of the invention provides that the tempering means can be switched to such a cooling mode that the hydraulic fluid has a temperature below room temperature. The cooling mode of the tempering means thereby provided allows the sleeve to be detached from the roller shell a very short time after the end of operations.

The invention further proposes that the outside circumference of the roller shell presses against the inside circumference of the sleeve with a friction-type lock at room temperature and means for cooling the roller shell to a temperature below room temperature when not in operation are provided. It is thereby possible to then fully load the roller unit immediately after being turned on. A great variety of measures are suitable for cooling the roller shell, for example fanning with cooled air.

A preferred embodiment of the invention thereby provides that, given employment of a hydraulic support of the roller shell, a cooling means for the hydraulic fluid is provided, this cooling means cooling to a temperature below room temperature. The charging thereby ensues with cooled hydraulic fluid.

The features of the invention disclosed in the above description, in the drawing, as well as in the claims can be essential both individually as well as in arbitrary combinations for the realization of the various embodiments of the invention.

I claim as my invention:

1. A roller unit for calenders, glazing rollers or the like, including a sag-compensated roller having a roller shell which is supported for the compensation of sags, and including a mating roller, whereby one of the rollers includes a surface engraving, comprising the improvement wherein the roller provided with the surface engraving is a sag-compensated roller; the surface engraving of the sag-compensated roller is arranged on an outer portion of the sag-compensated roller; the outer portion is removable in an axial direction; and the outer portion has at least its support region composed of a material having a lower coefficient of expansion than the component part it respectively envelopes.

2. A roller unit according to claim 1, wherein the outer portion having the surface engraving applied thereon is the roller shell.

3. A roller unit according to claim 1, wherein the roller shell has a lower wall thickness than the sleeve.

4. A roller unit according to claim 1, wherein a sleeve surrounds the roller shell and an outside diameter of the roller shell at room temperature is slightly smaller than an inside diameter of the sleeve and means for heating the roller shell during operation are provided.

5. A roller unit according to claim 4, wherein given employment of an hydraulic support of the roller shell, a tempering means for the hydraulic fluid is provided, this tempering means holding said hydraulic fluid at a prescribed temperature above room temperature.

6. A roller unit according to claim 5, wherein said tempering means can be switched to such a cooling mode that the hydraulic fluid has a temperature below room temperature.

7. A roller unit according to claim 4, wherein the outside circumference of the roller shell at room temperature presses non-positively locked against the inside circumference of the sleeve and means for cooling the roller shell to a temperature below room temperature when operations are not being carried out are provided.

8. A roller unit according to claim 1, wherein given employment of an hydraulic of the roller shell, a cooling means for the hydraulic fluid is provided, said cooling means cooling said hydraulic fluid to a temperature below room temperature.

9. A roller unit according to claim 4, wherein the roller shell has a low wall thickness which is inadequate for employment by itself and the stability required during operation is provided on the basis of support against the sleeve.

10. A roller unit according to claim 9, wherein the wall thickness of the roller shell is in a range of 5 through 20 mm and the wall thickness of the sleeve is in the range of 10 through 30 mm, whereby the sum of the two is in the range of 15 through 40 mm.

11. A roller unit according to claim 10, wherein the wall thickness of the roller shell is approximately 8 mm and that of the sleeve is approximately 18 mm.

* * * * *